United States Patent
Raffaelli et al.

(10) Patent No.: US 10,944,285 B2
(45) Date of Patent: *Mar. 9, 2021

(54) APPARATUS, METHODS, COMPUTER PROGRAMS, AND NON-TRANSITORY COMPUTER READABLE STORAGE MEDIUMS FOR CONTROLLING A POWER GENERATION SYSTEM

(71) Applicant: Rolls-Royce plc, London (GB)

(72) Inventors: Lorenzo Raffaelli, Sheffield (GB); Richard J. Tunstall, Bristol (GB)

(73) Assignee: ROLLS-ROYCE PLC, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/813,267

(22) Filed: Mar. 9, 2020

(65) Prior Publication Data

US 2020/0358306 A1  Nov. 12, 2020

Related U.S. Application Data

(63) Continuation of application No. 16/014,116, filed on Jun. 21, 2018, now Pat. No. 10,622,830.

(30) Foreign Application Priority Data

Jun. 29, 2017  (GB) ..................... 1710404

(51) Int. Cl.
*H02J 7/14* (2006.01)
*H02J 4/00* (2006.01)
(Continued)

(52) U.S. Cl.
CPC ............ *H02J 7/1492* (2013.01); *B60L 1/003* (2013.01); *F01D 15/10* (2013.01); *H02J 4/00* (2013.01);
(Continued)

(58) Field of Classification Search
CPC .......... H02J 7/1492; H02J 4/00; H02J 7/1438; H02J 7/1446; H02J 7/34; B60L 1/003; F01D 15/10
See application file for complete search history.

(56) References Cited

U.S. PATENT DOCUMENTS

| | | | | |
|---|---|---|---|---|
| 7,105,938 B2* | 9/2006 | Edelson | ................ | H02P 9/04 290/40 A |
| 8,258,640 B2* | 9/2012 | Conway | ................ | F02D 29/06 290/40 A |

(Continued)

FOREIGN PATENT DOCUMENTS

| CN | 102545255 A | 7/2012 |
|---|---|---|
| EP | 2 275 346 A2 | 1/2011 |

(Continued)

OTHER PUBLICATIONS

Great Britain Search Report, issued in GB Patent Application No. 1710404.3, dated Dec. 5, 2017, 1 pg., United Kingdom Intellectual Property Office, London, GB.

*Primary Examiner* — Viet P Nguyen
(74) *Attorney, Agent, or Firm* — Brinks Gilson & Lione

(57) ABSTRACT

Apparatus for controlling a power generation system, the apparatus comprising a controller configured to: identify a trigger indicative of a future change in electrical power output by the power generation system to a first power level; control the power generation system to change electrical power output to a second power level in response to the trigger, the second power level being equal to, or different to the first power level; and control supply of at least a portion of the electrical power output from the power generation system at the second power level to an electrical energy storage system to charge the electrical energy storage system.

19 Claims, 7 Drawing Sheets

(51) Int. Cl.
*F01D 15/10* (2006.01)
*H02J 7/34* (2006.01)
*B60L 1/00* (2006.01)
*H02J 3/00* (2006.01)

(52) U.S. Cl.
CPC .......... *H02J 7/1438* (2013.01); *H02J 7/1446* (2013.01); *H02J 7/34* (2013.01); *H02J 3/003* (2020.01)

(56) References Cited

U.S. PATENT DOCUMENTS

| | | | |
|---|---|---|---|
| 8,552,575 B2 | 10/2013 | Teets et al. | |
| 8,602,141 B2* | 12/2013 | Yee | B60W 20/00 180/65.21 |
| 10,622,830 B2* | 4/2020 | Raffaelli | H02J 7/34 |
| 2007/0213921 A1* | 9/2007 | Yamaguchi | B60W 10/30 701/115 |
| 2008/0276620 A1 | 11/2008 | Ullyott et al. | |
| 2010/0293951 A1 | 11/2010 | Fleming | |
| 2011/0089691 A1* | 4/2011 | Jones | F01D 15/10 290/43 |
| 2011/0178648 A1* | 7/2011 | Calvignac | H02J 7/1446 700/291 |
| 2013/0009463 A1* | 1/2013 | Iwasaki | H02J 3/32 307/9.1 |
| 2016/0052505 A1* | 2/2016 | Zhou | B60L 50/51 701/22 |
| 2017/0089261 A1* | 3/2017 | Bourne | F01D 21/003 |
| 2018/0244398 A1* | 8/2018 | Woodhouse | H02J 1/10 |

FOREIGN PATENT DOCUMENTS

| | | |
|---|---|---|
| WO | WO 2014/158238 A1 | 10/2014 |
| WO | WO 2015/133994 A1 | 9/2015 |

* cited by examiner

APPARATUS, METHODS, COMPUTER PROGRAMS, AND NON-TRANSITORY COMPUTER READABLE STORAGE MEDIUMS FOR CONTROLLING A POWER GENERATION SYSTEM

CROSS-REFERENCE TO RELATED APPLICATIONS

This application is a continuation of U.S. non-provisional application Ser. No. 16/014,116 filed Jun. 21, 2018, which claims priority under 35 USC § 119 to UK Patent Application Number 1710404.3 filed on Jun. 29, 2017. The entire contents of each of the above-identified applications are hereby incorporated by reference.

BACKGROUND

Technical Field

The present disclosure concerns apparatus, methods, computer programs, and non-transitory computer readable storage mediums for controlling a power generation system.

Description of the Related Art

Power generation systems may take a relatively long period of time to reach maximum power output. For example, a gas turbine engine may take approximately ten seconds to increase power output from an idle power output to a maximum (or high) power output. Gas turbine engine transient performance, including acceleration response, is typically limited by the amount of 'overfueling' that the gas turbine engine can tolerate without exceeding allowable compressor surge margins. At low engine speeds (and thus low power outputs) the allowable overfueling is small and the gas turbine acceleration response is relatively slow. As the shaft speed of the gas turbine engine increases, the allowable overfueling increases rapidly and the gas turbine acceleration response is relatively fast (that is, the gas turbine engine can accelerate much more rapidly). This may pose a challenging requirement on acceleration control schedules in order for gas turbine engines to start from low power and provide large amounts of thrust and power in short time scales. Similar constraints also apply to deceleration schedules.

SUMMARY

According to a first aspect there is provided apparatus for controlling a power generation system, the apparatus comprising a controller configured to: identify a trigger indicative of a future change in electrical power output by the power generation system to a first power level; control the power generation system to change electrical power output to a second power level in response to the trigger, the second power level being equal to, or different to, the first power level; and control supply of at least a portion of the electrical power output from the power generation system at the second power level to an electrical energy storage system to charge the electrical energy storage system.

The trigger may be indicative of a future increase in electrical power output by the power generation system. The second power level may be equal to, or less than, the first power level.

The trigger may be indicative of a future decrease in electrical power output by the power generation system. The second power level may be equal to, or greater than the first power level.

The controller may be configured to: control the power generation system to change electrical power output to the first power level from the second power level.

The controller may be configured to: control supply of electrical power output from the power generation system to one or more motors of a propulsion system.

The controller may be configured to: control supply of electrical power output from the electrical energy storage system to one or more motors of a propulsion system.

The controller may be configured to: receive a trigger signal from a user input device; and wherein the controller is configured to identify the trigger using the received trigger signal.

The controller may be configured to: receive location data from a global positioning sensor; and wherein the controller is configured to identify the trigger using the location data from the global positioning sensor.

A vehicle may comprise the power generation system. The controller may be configured to identify the trigger using an operating mode of a component of the vehicle.

The power generation system may comprise a gas turbine engine.

The electrical energy storage system may include one or more batteries and/or one or more supercapacitors.

According to a second aspect there is provided a vehicle comprising apparatus as described in any of the preceding paragraphs.

According to a third aspect there is provided a power station comprising apparatus as described in any of the preceding paragraphs.

According to a fourth aspect there is provided a method of controlling a power generation system, the method comprising: identifying a trigger indicative of a future change in electrical power output by the power generation system to a first power level; controlling the power generation system to change electrical power output to a second power level in response to the trigger, the second power level being equal to, or different to, the first power level; and controlling supply of at least a portion of the electrical power output from the power generation system at the second power level to an electrical energy storage system to charge the electrical energy storage system.

The trigger may be indicative of a future increase in electrical power output by the power generation system. The second power level may be equal to, or less than, the first power level.

The trigger may be indicative of a future decrease in electrical power output by the power generation system. The second power level may be equal to, or greater than the first power level.

The method may further comprise controlling the power generation system to change electrical power output to the first power level from the second power level.

The method may further comprise controlling supply of electrical power output from the power generation system to one or more motors of a propulsion system.

The method may further comprise controlling supply of electrical power output from the electrical energy storage system to one or more motors of a propulsion system.

The method may further comprise receiving a trigger signal from a user input device. The trigger may be identified using the received trigger signal.

The method may further comprise receiving location data from a global positioning sensor. The trigger may be identified using the location data from the global positioning sensor.

A vehicle may comprise the power generation system. The trigger may be identified using an operating mode of a component of the vehicle.

The power generation system may comprise a gas turbine engine.

The electrical energy storage system may include one or more batteries and/or one or more supercapacitors.

According to a fifth aspect there is provided a computer program that, when read by a computer, causes performance of the method as described in any of the preceding paragraphs.

According to a sixth aspect there is provided a non-transitory computer readable storage medium comprising computer readable instructions that, when read by a computer, cause performance of the method as described in any of the preceding paragraphs.

According to a seventh aspect there is provided a signal comprising computer readable instructions that, when read by a computer, cause performance of the method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
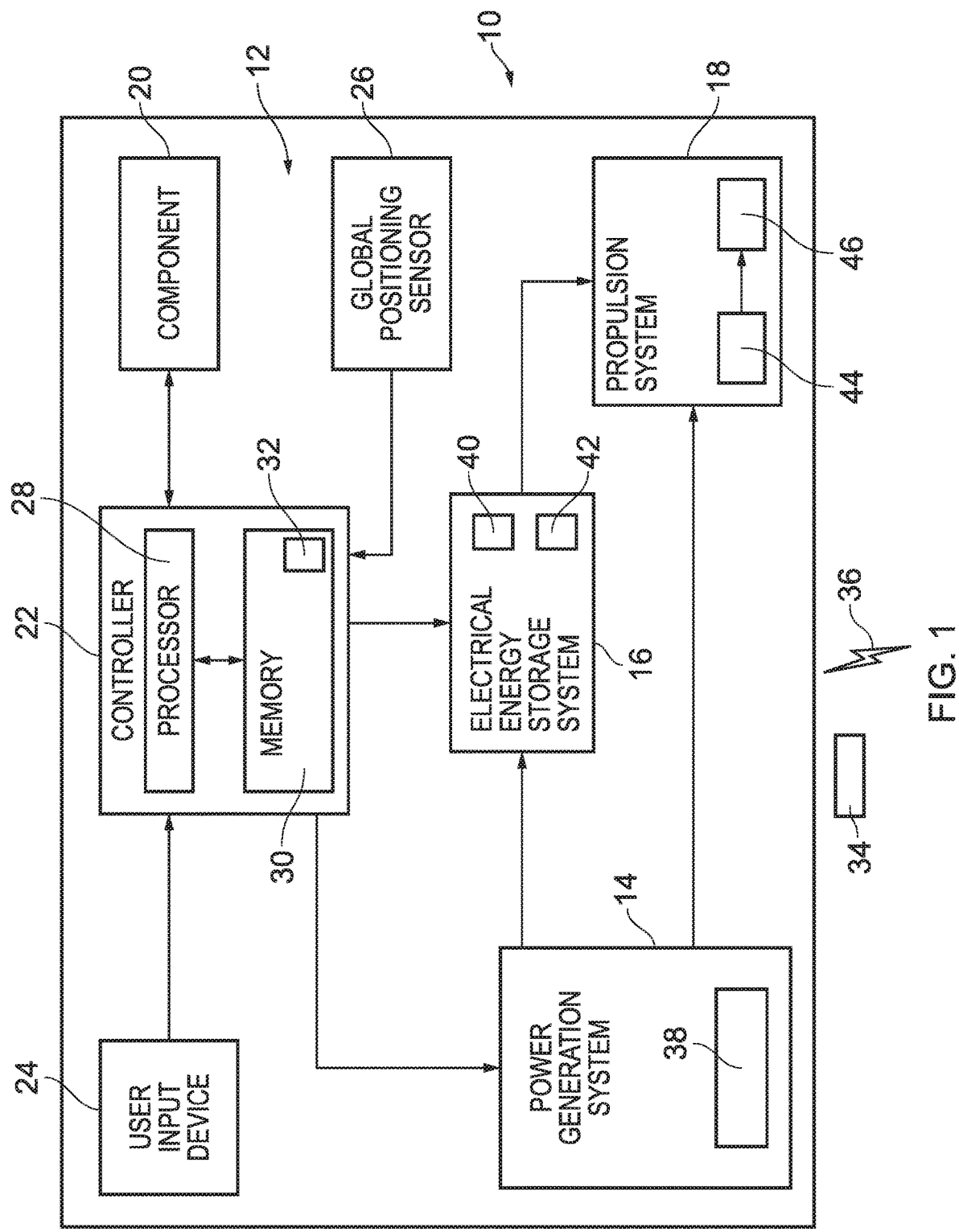
FIG. 1 illustrates a schematic diagram of a system comprising apparatus for controlling a power generation system according to various examples.

FIG. 1 illustrates a schematic diagram of a system 10 comprising apparatus 12, a power generation system 14, an electrical energy storage system 16, a propulsion system 18, and a component 20. In some examples, the system 10 may be a module. As used herein, the wording 'module' refers to a device or apparatus where one or more features are included at a later time and, possibly, by another manufacturer or by an end user. For example, where the system 10 is a module, the system 10 may only include the apparatus 12, and the remaining features may be added by another manufacturer, or by an end user. In another example where the system 10 is a module, the system 10 may only include the apparatus 12, the power generation system 14 and the propulsion system 18, and the remaining features (for example, the electrical energy storage system 16 and the component 20) may be added by another manufacturer, or by an end user.

The apparatus 12 is configured to control the power generation system 14 and may include a controller 22, a user input device 24, and a global positioning sensor 26. In some examples, the apparatus 12 may be a module and may only include the controller 22, and the remaining features (such as the user input device 24 and the global positioning sensor 26) may be added by another manufacturer, or by an end user.

Figure 2:
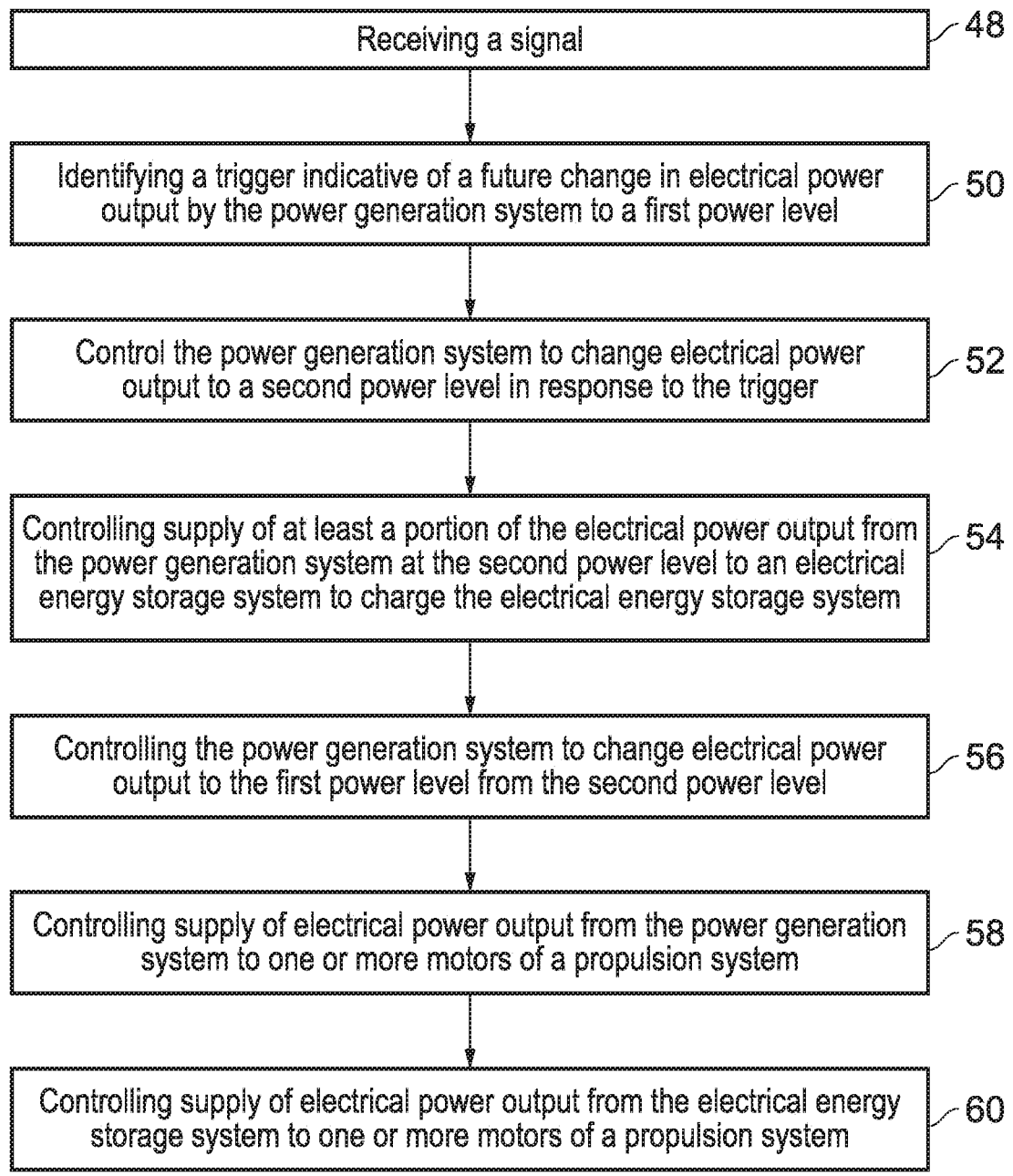
FIG. 2 illustrates a flow diagram of a method of controlling a power generation system according to various examples.

The controller 22 may comprise any suitable circuitry to cause performance of the methods described herein and as illustrated in FIG. 2. The controller 22 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 22 may comprise at least one processor 28 and at least one memory 30. The memory 30 stores a computer program 32 comprising computer readable instructions that, when read by the processor 28, causes performance of the methods described herein, and as illustrated in FIG. 2. The computer program 32 may be software or firmware, or may be a combination of software and firmware.

The processor 28 may include at least one microprocessor and may comprise a single core processor, may comprise multiple processor cores (such as a dual core processor or a quad core processor), or may comprise a plurality of processors (at least one of which may comprise multiple processor cores).

The memory 30 may be any suitable non-transitory computer readable storage medium, data storage device or devices, and may comprise a hard disk drive (HDD) and/or a solid state drive (SSD). The memory 30 may be permanent non-removable memory, or may be removable memory (such as a universal serial bus (USB) flash drive or a secure digital card). The memory 30 may include: local memory employed during actual execution of the computer program; bulk storage; and cache memories which provide temporary storage of at least some computer readable or computer usable program code to reduce the number of times code may be retrieved from bulk storage during execution of the code.

The computer program 32 may be stored on a non-transitory computer readable storage medium 34. The computer program 32 may be transferred from the non-transitory computer readable storage medium 34 to the memory 30. The non-transitory computer readable storage medium 34 may be, for example, a USB flash drive, a secure digital (SD) card, an optical disc (such as a compact disc (CD), a digital versatile disc (DVD) or a Blu-ray disc). In some examples, the computer program 32 may be transferred to the memory 30 via a signal 36 (such as a wireless signal or a wired signal).

Input/output devices may be coupled to the controller 22 either directly or through intervening input/output controllers. Various communication adaptors may also be coupled to the controller 22 to enable the apparatus 12 to become coupled to other apparatus or remote printers or storage devices through intervening private or public networks. Non-limiting examples include modems and network adaptors of such communication adaptors.

The user input device 24 may comprise any suitable device for enabling an operator to provide a signal to the controller 22. For example, the user input device 24 may comprise one or more of a keyboard, a keypad, a touchpad, a touchscreen display, a computer mouse, a joystick, a yoke, a button, a switch, or a throttle. The controller 22 is configured to receive signals from the user input device 24.

The global positioning sensor 26 may be any global navigation satellite system (GNSS) sensor and is configured to sense a location of the power generation system 14 and to generate location data. For example, the global positioning sensor 26 may comprise a global positioning system (GPS) sensor, and/or a Galileo sensor, and/or a Russian Global Navigation Satellite System (GLONASS) sensor, and/or a BeiDou Navigation Satellite System (BDS) sensor. The controller 22 is configured to receive the location data from the global positioning sensor 26.

The power generation system 14 may comprise any suitable engines, system, or mechanism for generating electrical energy. For example, the power generation system 14 may comprise one or more gas turbine engines 38, and/or a reciprocating engine (such as a diesel engine), and/or a nuclear reactor for generating electrical energy.

The controller 22 is configured to control the electrical power output from the power generation system 14. For example, where the power generation system 14 comprises the one or more gas turbine engines 38, the controller 22 may be configured to control the supply of fuel to the one or more gas turbine engines 38 to increase and decrease the shaft speed of the gas turbine engines 38, and thus the electrical power output by the gas turbine engines 38.

The controller 22 is configured to control the power generation system 14 to provide a part, or all of the electrical power output to the electrical energy storage system 16. Additionally, the controller 22 is configured to control the power generation system 14 to provide a part, or all of the electrical power output to the propulsion system 18. It should be appreciated that the controller 22 may control the power generation system 14 to output electrical power to the electrical energy storage system 16 and the propulsion system 18 simultaneously.

The electrical energy storage system 16 may include any suitable device or devices for storing electrical energy generated by the power generation system 14. For example, the electrical energy storage system 16 may include one or more batteries 40 and/or one or more supercapacitors 42. The controller 22 is configured to control supply of electrical power output from the electrical energy storage system 16 to the propulsion system 18.

The propulsion system 18 is configured to receive electrical energy from the power generation system 14 and/or the electrical energy storage system 16 and to use the electrical energy to generate thrust to propel the system 10. For example, the propulsion system 18 may comprise one or more electrical motors 44 and one or more fans 46. The one or more electrical motors 44 are configured to convert electrical power into mechanical power to rotate the one or more fans 46 and thus generate thrust.

Figure 5:
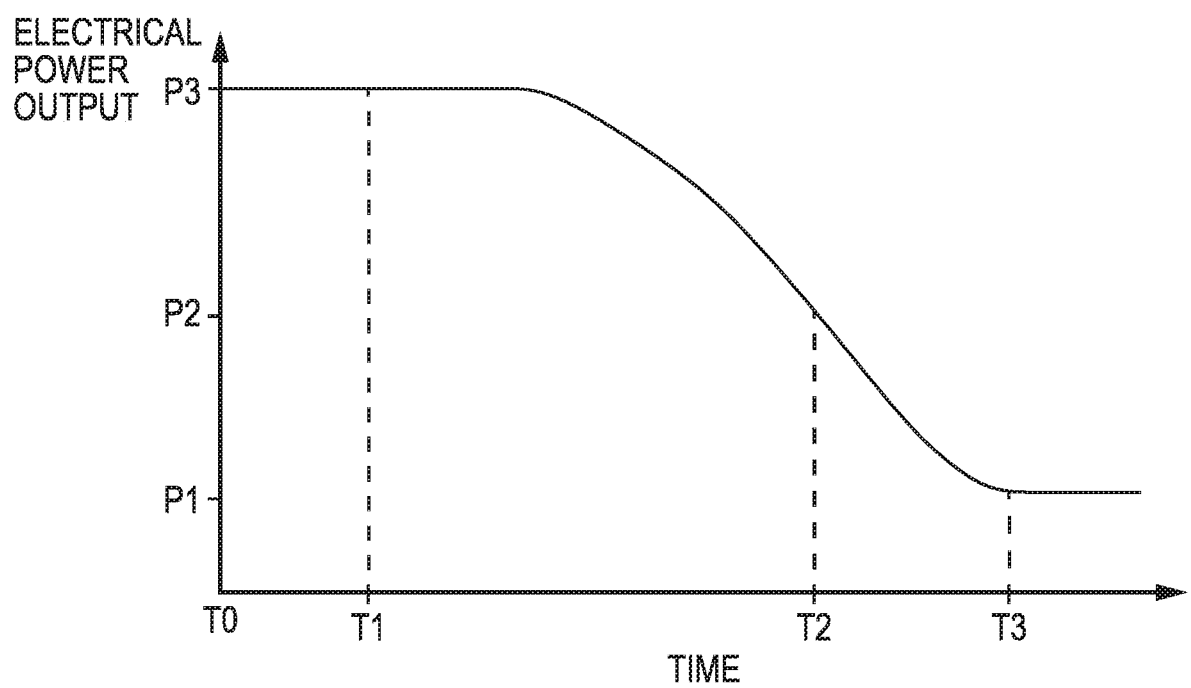
FIG. 5 illustrates a graph of electrical power output of a power generation system versus time according to a third example.
Figure 6:
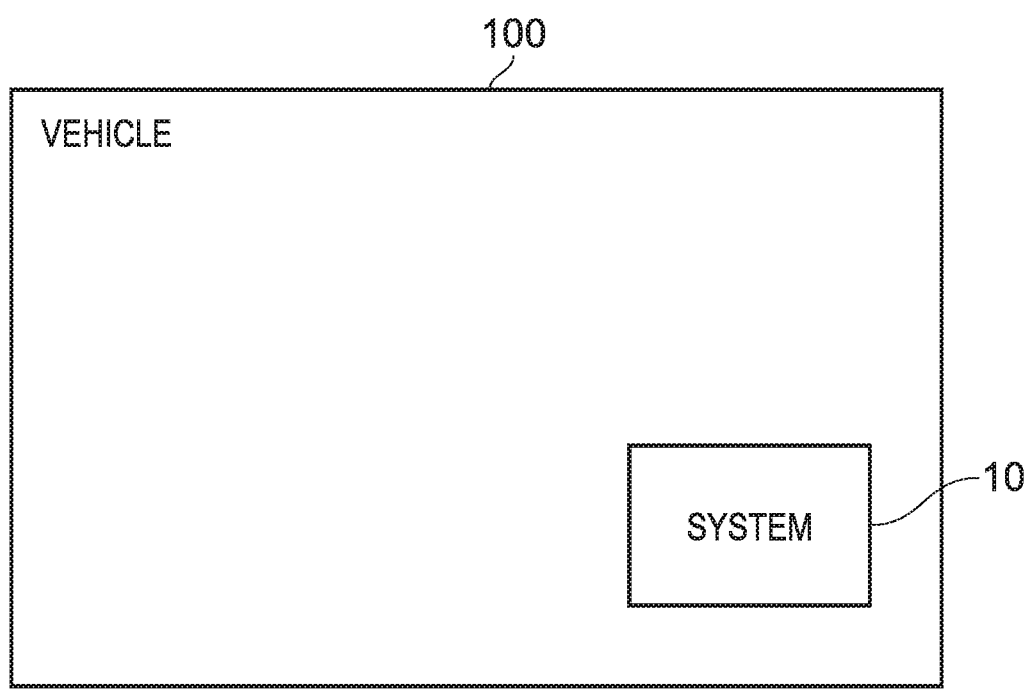
FIG. 6 illustrates a schematic diagram of a vehicle comprising a system according to various examples.
Figure 7:
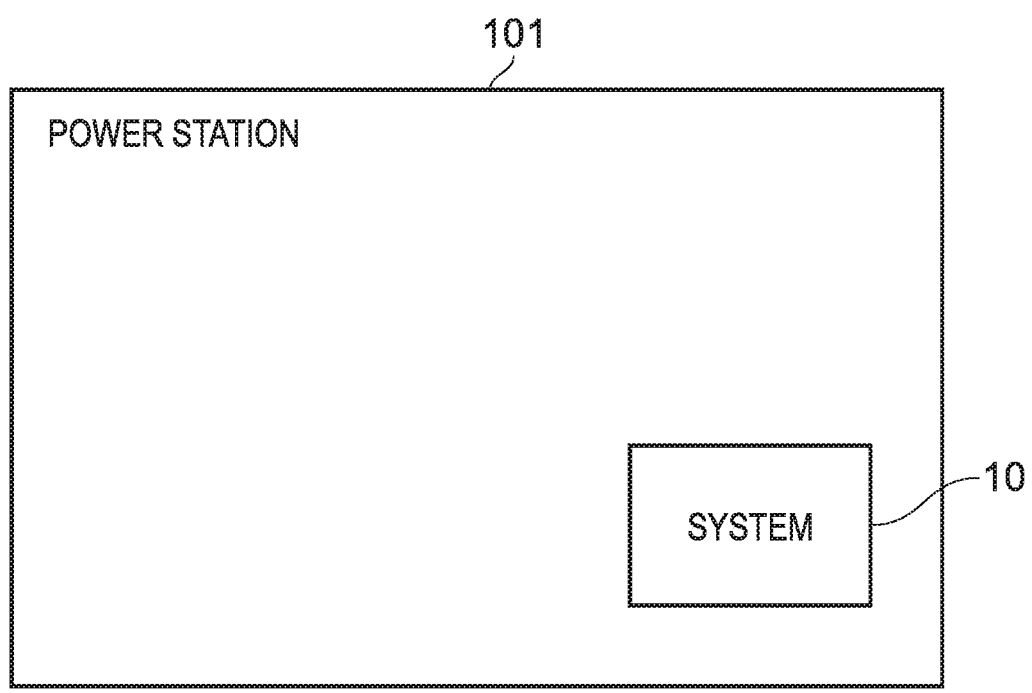
FIG. 7 illustrates a schematic diagram of a power station comprising a system according to various examples.

The component 20 may be a component of a vehicle or a power station, or may be an assembly of components of a vehicle or a power station. As illustrated in FIG. 5, a vehicle 100 (such as an aircraft, a watercraft, or a land vehicle) may comprise the system 10. For example, where the vehicle is an aircraft, the component 20 may include a flap in a wing of the aircraft. By way of another example, where the vehicle is an aircraft, the component 20 may include a landing gear of the aircraft. As illustrated in FIG. 6, a power station 101 may comprise the system 10, and the component 20 may include one or more valves of the power station 101. The component 20 may receive electrical power from the electrical energy storage system 16 and/or from the power generation system 38. Arrows representing the supply of electrical power to the component 20 are not illustrated to maintain the clarity of FIG. 1.

The operation of the system 10 is described in the following paragraphs with reference to FIGS. 2 to 5.

At a time T0, the power generation system 14 has an electrical power output of P3. In the examples illustrated in FIGS. 3 & 4, the electrical power output P3 is an idle power output of the one or more gas turbine engines 38 where the turbine shaft speed is three thousand revolutions per minute. In the example illustrated in FIG. 5, the electrical power output P3 is a relatively high (or maximum) power output of the one or more gas turbine engines 38 where the turbine shaft speed is ten thousand revolutions per minute.

At block 48, the method may include receiving a signal at a time T1. For example, an operator may know that a transient manoeuvre (such as aircraft take off, landing, or taxiing) is to occur in the near future and may operate the user input device 24 at the time T1 to provide a trigger signal to the controller 22. By way of another example, the controller 22 may receive location data in a signal from the global positioning sensor 26 at the time T1.

At block 50, the method includes identifying a trigger indicative of a future change in electrical power output by the power generation system 14 to a first power level P1. For example, where the controller 22 has received a trigger signal from the user input device 24, the controller 22 may identify the trigger using the received trigger signal. By way of another example, where the controller 22 has received location data in a signal from the global positioning sensor 26, the controller 22 may identify the trigger by determining whether the location of the global positioning sensor 26 is within a predetermined geographical area (for example, a runway at an airport) and thus indicative that a transient manoeuvre is to occur (aircraft take off for example). In a further example where the system 10 includes the component 20, the controller 22 may identify the trigger using an operating mode of the component 20. For example, the controller 22 may identify the trigger by determining that flaps on a wing of an aircraft are extended.

Figure 3:
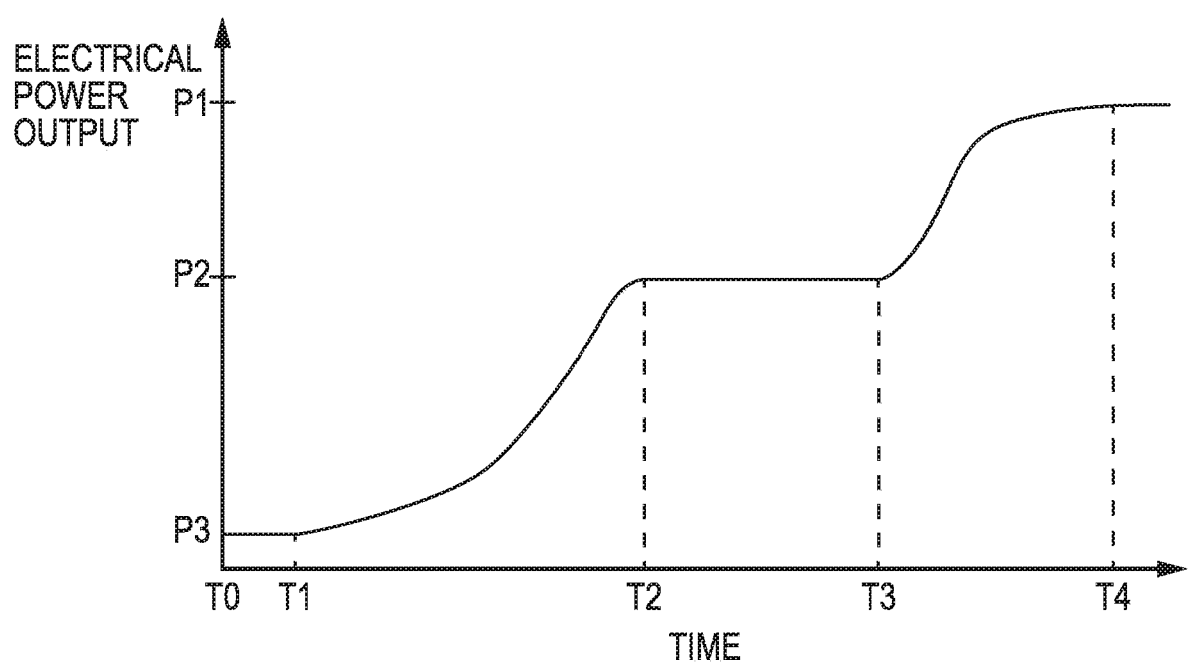
FIG. 3 illustrates a graph of electrical power output of a power generation system versus time according to a first example.
Figure 4:
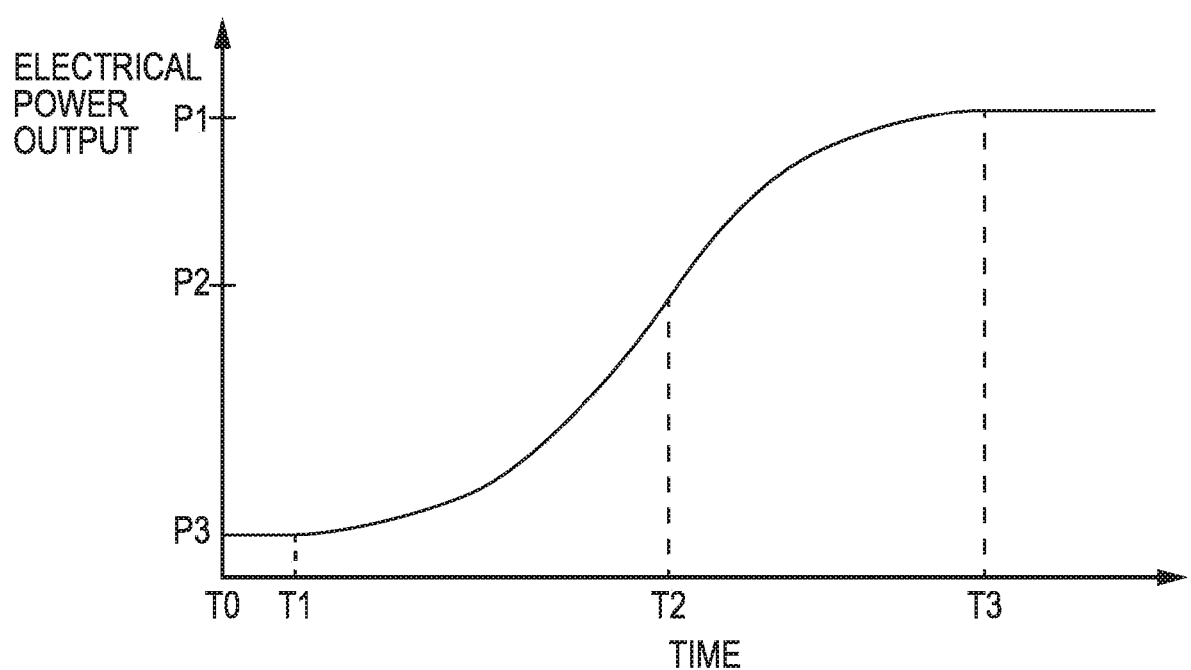
FIG. 4 illustrates a graph of electrical power output of a power generation system versus time according to a second example.

At block 52, the method includes controlling the power generation system 14 to change electrical power output to a second power level P2 in response to the trigger. For example, the controller 22 may increase the supply of fuel to the one or more gas turbine engines 38 in response to the identification of the trigger in block 50. As illustrated in FIGS. 3 and 4, the electrical power output from the power generation system 14 increases at, or shortly after time T1, to the second power level P2 which is reached at time T2. As illustrated in FIG. 5, the electrical power output from the power generation system 14 decreases at, or shortly after time T1, to the second power level P2 which is reached at time T2.

At block 54, the method includes controlling supply of at least a portion of the electrical power output from the power generation system 14 at the second power level P2 to the electrical energy storage system 16 to charge the electrical energy storage system 16. For example, at any time between T1 and T2 in FIGS. 3, 4 and 5, the controller 22 may control the supply of at least a portion of the electrical power output from the power generation system 14 to the electrical energy storage system 16 to charge the electrical energy storage system 16.

At block 56, the method may include controlling the power generation system 14 to change electrical power output to the first power level P1 from the second power level P2. As illustrated in FIG. 3, the electrical power output from the power generation system 14 may be constant at the second power level P2 between times T2 and T3, and at time T3, the controller 22 controls the power generation system 14 to increase electrical power output to the first power level P1. At time T4, the electrical power output from the power generation system 14 reaches the first power level P1. Alternatively, as illustrated in FIG. 4, the controller 22 may control the power generation system 14 to increase electrical power output to the first power level at time T2 (that is, the electrical power output from the power generation system 14 may not be held constant at the second power level P2 for a period of time). At time T3, the electrical power output from the power generation system 14 reaches the first power level P1. As illustrated in FIG. 5, the controller 22 may control the power generation system 14 to decrease electrical power output to the first power level P1 at time T2.

At block 58, the method may include controlling supply of electrical power output from the power generation system 14 to the one or more motors 44 of the propulsion system 18. For example, at time T3 as illustrated in FIG. 3, or at time T2 as illustrated in FIG. 4, the controller 22 may control the power generation system 14 to supply one hundred percent of electrical power output to the one or more motors 44 of the propulsion system 18. In another example, at time T3 as illustrated in FIG. 3, or at time T2 as illustrated in FIG. 4, the controller 22 may control the power generation system 14 to supply a portion of electrical power output to the one or more motors 44 of the propulsion system 18. The portion of electrical power output supplied to the propulsion system 18 may be equal to or greater than fifty percent, or may be equal to or greater than sixty percent, or may be equal to or greater than seventy percent, or may be equal to or greater than eighty percent, or may be equal to or greater than ninety percent. The remaining electrical power output may be supplied to other components (such as the electrical systems of an aircraft for example).

In the example illustrated in FIG. 5, at any time after T1 the controller 22 may control the power generation system 14 to supply a portion of the electrical power output to the one or more motors 44 of the propulsion system 18, and to supply a portion of the electrical power output to the electrical energy storage system 16.

In some examples, the electrical power output from the power generation system 14 may be supplied to the electrical energy storage system 16 until after the first electrical power output P1 has been reached. For example, in FIG. 3 the electrical power output from the power generation system 14 may be supplied to the electrical energy storage system 16 at any time from T1 and until any time after T4 (that is, after the first electrical power output P1 has been reached). By way of another example, in FIG. 4 the electrical power output from the power generation system 14 may be supplied to the electrical energy storage system 16 at any time from T1 and until any time after T3.

At block 60, the method may include controlling supply of electrical power output from the electrical energy storage system 16 to the one or more motors 44 of the propulsion system 18. For example, at or after time T3 as illustrated in FIG. 3, or at or after time T2 as illustrated in FIG. 4, the controller 22 may control the electrical energy storage system 16 to supply electrical energy to the one or more motors 44. Consequently, the electrical energy storage system 16 may supplement the electrical energy being provided to the propulsion system 18 and may thus provide additional thrust.

The system 10, the apparatus 12 and the methods described above may provide several advantages.

First, the methods may provide a relatively fast transient thrust response by increasing the electrical power output from the power generation system 14 before it is needed by the propulsion system 18. For example, the one or more gas turbine engines 38 may take ten seconds to increase turbine shaft speed from three thousand revolutions per minute (corresponding to electrical power output P3) to ten thousand revolutions per minute (corresponding to the first electrical power output P1), whereas the one or more gas turbine engines may take three seconds to increase turbine shaft speed from seven thousand revolutions per minute (corresponding to the second electrical power output P2) to ten thousand revolutions per minute (corresponding to the first electrical power output P1).

Second, as mentioned above, the methods may enable the power generation system 14 to decelerate relatively slowly and for excess energy to be stored in the electrical energy storage system 16 for later use. Where the power generation system 14 includes the one or more gas turbine engines 38, this may help to prevent the one or more gas turbine engines 38 exceeding their compressor surge margin during deceleration and thus may prevent damage to the one or more gas turbine engines 38.

Aircraft propulsion specifications usually include requirements for how quickly thrust can be reduced to idling level in the event of a rejected take-off, and so on. The methods and apparatus 12 may be configured to meet such a thrust reduction time target whilst allowing the power generation system to decelerate more slowly and diverting the excess generated electrical power from the propulsion system 18 to the electrical energy storage system 16. The methods and apparatus 12 may allow the power generation system 14 to be designed for slower power transients, and for example, to be operated without the need for handling bleed valves.

Third, the electrical power output from the power generation system 14 is diverted to the electrical energy storage system 16 between times T1 and T3 (as illustrated in FIG. 3) or between times T1 and T2 (as illustrated in FIG. 4) to charge the electrical energy storage system 16. The stored electrical energy may be supplied to the propulsion system 18 at a later time to provide thrust. For example, the stored electrical energy may be supplied to the propulsion system 18 in addition to the electrical energy supplied by the power generation system 14 to provide additional thrust between times T3 and T4 (as illustrated in FIG. 3) or between times T2 and T3 (as illustrated in FIG. 4). By way of another example, the propulsion system 18 may solely receive the stored electrical energy in geographical areas (such as taxiways at an airport) where emissions from the power generation system 14 are undesirable, restricted or prohibited.

Fourth, the methods may enable the one or more gas turbine engines 38 to operate with reduced (or zero) handling bleed flows. This may advantageously reduce the noise emissions from the one or more gas turbine engines 38.

Fifth, the methods may enable the electrical energy storage system 16 to be relatively small since the electrical power output from the power generation system 14 is increased before it is needed by the propulsion system 18 and consequently, less (or zero) electrical energy may be required from the electrical energy storage system 16 during the transient manoeuvre.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

We claim:

1. Apparatus for controlling a power generation system, the apparatus comprising a controller configured to:
   identify, in a signal received by the controller, an indication of a future change in electrical power output by the power generation system, the future change being a decrease from a current power level, which is outputted by the power generation system when the indication is identified, to a first power level;
   control the power generation system to decrease electrical power output to a second power level in response to the indication of the future change, the second power level being equal to, or different to, the first power level; and
   control supply of at least a portion of the electrical power output from the power generation system at the second power level to an electrical energy storage system to charge the electrical energy storage system, wherein the decrease to the second power level is from a deceleration of an engine of the power generation system caused at least in part by the supply of the at least the portion of the electrical power output by the power generation system that is not needed by a propulsion system to the electrical energy storage system before the first power level is reached.

2. The apparatus as claimed in claim 1, wherein the indication of the future change is indicative of a future decrease in electrical power output by the power generation system, and the second power level is equal to, or greater than the first power level.

3. The apparatus as claimed in claim 1, wherein the controller is configured to:
   control the power generation system to change electrical power output to the first power level from the second power level.

4. The apparatus as claimed in claim 1, wherein the controller is configured to: control supply of electrical power output from the power generation system to one or more motors of a propulsion system.

5. The apparatus as claimed in claim 1, wherein the controller is configured to: control supply of electrical power output from the electrical energy storage system to one or more motors of a propulsion system.

6. The apparatus as claimed in claim 1, wherein the signal is a trigger signal from a user input device; and wherein the controller is configured to: receive a trigger signal from a user input device; and wherein the controller is configured to identify the indication of the future change from the received trigger signal.

7. The apparatus as claimed in claim 1, wherein the controller is configured to: receive, in the signal, location data from a global positioning sensor; and wherein the controller is configured to identify the indication of the future change from the location data from the global positioning sensor.

8. The apparatus as claimed in claim 1, wherein a vehicle comprises the power generation system, and wherein the controller is configured to identify the indication of the future change from an operating mode of a component of the vehicle.

9. The apparatus as claimed in claim 1, wherein the power generation system comprises a gas turbine engine.

10. The apparatus as claimed in claim 1, wherein the electrical energy storage system includes one or more batteries and/or one or more supercapacitors.

11. A method of controlling a power generation system, the method comprising:
    identifying, in a signal received by a controller, an indication of a future change in electrical power output by the power generation system, the future change being a decrease from a current power level, which is outputted by the power generation system when the indication is identified, to a first power level;
    controlling the power generation system to decrease the electrical power output to a second power level in response to the indication of the future change, the second power level being equal to, or different to the first power level; and
    controlling supply of at least a portion of the electrical power output from the power generation system at the second power level to an electrical energy storage system to charge the electrical energy storage system, the decrease to the second power level is from a deceleration of an engine of the power generation system that resulted at least in part by the supply of the at least the portion of the electrical power output by the power generation system that is not needed by a propulsion system to the electrical energy storage system before the first power level is reached.

12. The method as claimed in claim 11, wherein the indication of the future change is indicative of a future decrease in electrical power output by the power generation system, and the second power level is equal to, or greater than the first power level.

13. The method as claimed in claim 11, further comprising controlling the power generation system to change electrical power output to the first power level from the second power level.

14. The method as claimed in claim 11, further comprising controlling supply of electrical power output from the power generation system to one or more motors of a propulsion system.

15. The method as claimed in claim 11, further comprising controlling supply of electrical power output from the electrical energy storage system to one or more motors of a propulsion system.

16. The method as claimed in claim 11, wherein the signal is a trigger signal from a user input device; and wherein the method further comprises receiving the trigger signal from the user input device; and wherein the indication of the future change is identified from the received trigger signal.

17. The method as claimed in claim 11, further comprising receiving, in the signal, location data from a global positioning sensor; and wherein the indication of the future change is identified using the location data from the global positioning sensor.

18. The method as claimed in claim 11, wherein a vehicle comprises the power generation system, and wherein the indication of the future change is identified using an operating mode of a component of the vehicle.

19. A non-transitory computer readable storage medium comprising computer readable instructions that, when read by a computer, cause performance of the method as claimed in claim 11.

* * * * *